3,111,382
ALUMINA FROM IMPURE ALUMINUM SALTS
John C. Hayes, Palatine, Ill., assignor to Universal Oil Products Company, Des Plaines, Ill., a corporation of Delaware
No Drawing. Filed Jan. 18, 1962, Ser. No. 167,186
9 Claims. (Cl. 23—143)

The present invention relates to the manufacture of alumina, and is particularly directed toward a method for the preparation of alumina from impurity-containing aluminum salts. More specifically, the present invention affords a method for improving the purity of alumina when the same is prepared from an aluminum salt containing at least one impurity selected from the group of alkaline-earth metals.

Alumina, either as aluminum oxide hydrate, or as aluminum hydroxide, is extensively employed throughout the chemical and petroleum industries. It is often utilized as a dehydrating, treating or purifying agent, or as a catalytic-acting material in and of itself. Alumina is probably most often utilized, however, as the carrier material for a wide variety of catalytically active metallic components in the manufacture of a multitude of conversion and/or treating catalysts. Many investigations have been conducted with respect to manufacturing procedures for the purpose of producing relatively inexpensive, high-purity alumina. Precipitation methods have been studied whereby a relatively weak alkaline material, such as an aqueous solution of ammonium hydroxide, is added to a solution of a suitable aluminum salt to form a precipitate of alumina. The "oil-drop" method, as described in U.S. Patent No. 2,620,314, issued to James Hoekstra, was developed for the purpose of producing alumina particles of spherical shape. Briefly, in the oil-drop method, an aluminum salt solution, or hydrosol, is formed, commingled with a suitable gelling agent, the mixture being passed into a hot oil bath wherein gelation thereof is effected to form alumina hydrogel particles. Whether by precipitation means, or the oil-drop method, the alumina hydrogel particles are subsequently dried and calcined at an elevated temperature to form the finished alumina product.

Regardless of the particular use for which the finished alumina product is intended, the same must generally possess a high degree of purity. For this reason, a great majority of the methods of manufacturing alumina employ metallic aluminum of virtually 100% purity as the initial source thereof. This is particularly true when the alumina is intended for use as the carrier material for catalytically active metallic components. The composition of a catalyst is generally such that the active metallic components are present in minor quantities compared to the quantity of the alumina employed as the carrier material. For example, active metallic components selected from groups VI-B and VIII of the periodic table are generally present in amounts ranging from about 0.01% to about 20.0% by weight of the total composite, the precise quantities being determined by the desired catalytic characteristics. Thus, even minute quantities of metallic impurities, in particular instances as low as about 0.0002% by weight (2.0 p.p.m.), have the tendency to inhibit or otherwise detrimentally affect the desired catalytic action. The presence of alkaline-earth metals can affect detrimentally the intended use of alumina even where a high degree of purity is not essential as where the alumina is to be used as a carrier material.

Alumina, for utilization as a catalyst or carrier material, is generally prepared, as hereinabove set forth, by precipitation from an aluminum salt solution, such as the chloride, sulfate, nitrate, carbonate, etc., or via the gelation of an aluminum-containing hydrosol. Such solutions or sols invariably contain ionic metallic contaminants in varying degrees. The purity of the alumina produced therefrom is at least partially dependent upon the success achieved in preventing the co-precipitation, or co-gelation of the undesired contaminants along with the alumina, such that they do not appear in the finished alumina product. Many metallic contaminants are readily removed by relatively simple processing techniques. On the other hand, some contaminating metals, often present in detrimental quantities, are not as readily removed and often appear in the finished product. This is especially true of the alkaline-earth metals including beryllium, magnesium, calcium, strontium, and barium. Of the alkaline-earth metals, magnesium and calcium are present as contaminating influences more often, and in greater concentrations than beryllium, strontium and/or barium. Magnesium and calcium are generally found in relatively large quantities in the aluminum sulfate which results in abundant quantities from processes designed to recover catalytically active metallic components from an alumina composite thereof through the utilization of sulfuric acid to digest the alumina.

The primary object of the present invention is to provide a method for manufacturing alumina utilizing aluminum salts containing metallic impurities from the group of alkaline-earth metals and compounds thereof. As hereinafter indicated, the present invention is specifically directed toward the use of aluminum salts containing ionic, detrimental quantities of calcium magnesium. It is understood that the precise character of the aluminum salt, whether the chloride, sulfate, nitrate, carbonate, etc., is not considered a limiting feature of the present invention.

In a broad embodiment, the present invention relates to a method of preparing alumina from an aluminum salt containing an impurity from the group of alkaline-earth metals which comprises contacting an alumina hydrogel, formed from said aluminum salt, with a carboxylic acid-substituted cyclo alkyl diamine, separating said hydrogel from the resulting mixture and thereafter calcining the hydrogel to form alumina substantially free from alkaline-earth metals and compounds thereof.

Another broad embodiment of the present invention involves a method of preparing alumina from an aluminum salt containing an impurity from the group of alkaline-earth metals which comprises commingling said aluminum salt with a carboxylic acid-substituted cyclo alkyl diamine, the carboxylic acid radical of which contains from about 2 to about 7 carbon atoms per molecule, forming an alumina hydrogel from the resulting mixture, and thereafter calcining said hydrogel to form alumina substantially free from alkaline-earth metals and compounds thereof.

The present invention is specifically directed toward a method of preparing alumina from a solution of an aluminum salt containing an impurity from the group of calcium, magnesium and mixtures thereof, which comprises commingling said solution with at least one mol of a carboxylic acid-substituted cyclo alkyl diamine, the carboxylic acid radical of which contains from about 2 to about 7 carbon atoms per molecule, per mol of calcium and magnesuim present in said solution, forming an alumina hydrogel from the resulting mixture at an acidic pH within the range of from about 4.5 to about 7.0, and thereafter calcining said hydrogel to form alumina substantially free from calcium and magnesium.

As hereinbefore stated, aluminum salts to be utilized in the preparation of alumina generally contain ionic quantities of alkaline-earth metals, particularly calcium and/or magnesium, which exert detrimental effects when present in the final product. In the case of certain metallic ions, the co-precipitation thereof with the alumina is relatively easily prevented by removing the undesired ions from the solution prior to precipitation or gelation. For example, metallic ions of copper, lead, zinc, iron, chromium, cobalt, molybdenum and nickel are readily removed from aluminum salt solutions and hydrosols by means of electrolytic precipitation, employing a mercury cathode electrolytic cell. In the case of alkali metal ions, such as sodium and/or potassium, electrolytic precipitation is less feasible because of the low electron affinity of sodium and/or potassium. These ions are, however, relatively readily removed after precipitation of the alumina due to the high degree of solubility of the hydroxides thereof. The removal is effected by a thorough washing of the precipitated or gelled alumina, prior to drying and high-temperature calcination to form the final alumina product.

With respect to the alkaline-earth metals, and particularly magnesium and calcium, the metal ions are not readily reducible at a mercury cathode, and electrolytic precipitation is not, therefore, effective as a purifying technique. Furthermore, the high degree of insolubility of the alkaline-earth hydroxides, causes removal by simple washing of the precipitated alumina to be virtually ineffective. The result is, therefore, that none of the usual methods for purifying an aluminum salt solution or hydrosol, or the precipitates obtained therefrom, is effective in lowering the contamination level represented by the alkaline-earth metal ions, and particularly calcium and/or magnesium.

Through the utilization of the method of the present invention, the undesirable situation arising as a result of the presence of alkaline-earth metallic ions is alleviated by forming soluble complexes of these ions at an appropriate stage in the precipitation or gelation process so that they may be, as are the alkali metal ions, washed out of the precipitated or gelled alumina, or are not caused to precipitate along with the alumina hydrogel. In accordance with the method of the present invention, the soluble complex of the alkaline-earth ion, for example magnesium, is formed by commingling a carboxylic acid-substituted cyclo alkyl diamine, the carboxylic acid radical of which contains from about 2 to about 7 carbon atoms per molecule, with the alumina hydrogel. It is understood that the hydrogel may be contacted with the carboxylic acid-substituted cyclo alkyl diamine after the same has been formed, and prior to the high-temperature calcination procedure, or the carboxylic acid-substituted cyclo alkyl diamine may be commingled with the aluminum salt solution or hydrosol prior to effecting the precipitation of the alumina hydrogel. Carboxylic acid-substituted cyclo alkyl diamines containing more than about 7 carbon atoms per molecule in the carboxylic acid radicals do not readily form an easily removable soluble complex with magnesium and calcium ions, and, therefore, the soluble complex is formed with a cyclo alkyl diamine having a carboxylic acid radical containing from about 2 to about 7 carbon atoms per molecule. Suitable carboxylic acid-substituted cyclo alkyl diamines include, but not by way of limitation, 1,3-diamonicyclohexane-N,N'-tetraacetic acid, 1,4-diaminocyclohexane-N,N'-tetraacetic acid, 1,2-diaminocyclohexane-N,N'-tetraacetic acid, 1,3-diaminocyclohexane-N,N'-propionic acid, 1,3-diaminocyclohexane-N,N'-butyric acid, etc. From the foregoing partial list of carboxylic acid-substituted cyclo alkyl diamines, it is seen that the same may be represented by the following structural formulae:

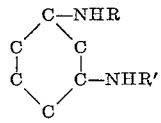 (1)

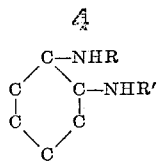 (2)

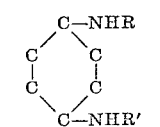 (3)

In the above structural formulae, R and R' represent carboxylic acid radicals containing from about 2 to about 7 carbon atoms per molecule; it is not necessary that R and R' be of the same chemical character. Furthermore, the carboxylic acid radical may be substituted for both hydrogen atoms attached to the nitrogen atom, as in the case of 1,3-diaminocyclohexane-N,N'-tetraacetic acid.

The carboxylic acid-substituted cyclo alkyl diamine is preferably added to the aluminum salt solution prior to forming the alumina hydrogel therefrom. The amount of the carboxylic acid-substituted cyclo alkyl diamine commingled with the aluminum salt solution is determined by the quantity of the contaminating metallic ions present therein. At least one mol is employed per mol of metallic ion present. In those instances where the alumina hydrogel is initially formed in the absence of the carboxylic acid-substituted cyclo alkyl diamine, to be subsequently contacted therewith in a washing procedure, the washing solution may contain up to about 5 mols of the substituted cyclo alkyl diamine, per mol of metallic ion present. During precipitation or gelation in the presence of the cyclo alkyl diamine, the precipitating mixture should be at a pH within the range of from about 4.5 to about 7.0, and preferably from about 4.5 to about 5.5. At an acidic pH level within the foregoing range, it is possible to form the soluble complexes of the alkaline-earth ions more readily due to the favorable ratio of free calcium and magnesium ions to free aluminum ions. In any event, the complexes thus formed will remain stable and soluble during the completion of the precipitation or gelation, and are readily removed from the precipitate by relatively simple washing techniques prior to the drying and/or high-temperature calcination thereof.

The following example is given for the purpose of illustrating the method of effecting the present invention. It is not intended to limit the present invention to the reagents, concentrations and/or conditions employed within the example.

*Example*

An aqueous solution of aluminum sulfate, having a specific gravity of about 1.28, and prepared from the aluminum sulfate recovered as the by-product from the sulfuric acid digestion of an alumina-platinum composite, is commingled with 1,3-diaminocyclohexane-N-N'-tetraacetic acid in an amount to yield a 1.1 mol ratio of the latter to the alkaline-earth metal ions present within the aluminum sulfate solution. A typical analysis of the aluminum sulfate, recovered from a platinum recovery process, indicates the presence therein of about 0.005% by weight (50.0 p.p.m.) of magnesium and about 0.005% by weight of calcium. These quantities of calcium and magnesium, if allowed to remain within the aluminum sulfate solution, would, under normal circumstances, appear in the alumina hydrogel which is prepared therefrom. When such alumina is employed as the carrier material for catalytically active metallic components, the calcium and magnesium ions affect detrimentally the use for which the catalytic composite is intended.

The mixture of aluminum sulfate and 1,3-diaminocyclohexane-N-N'-tetraacetic acid is commingled with a 28% by weight solution of ammonium hydroxide, the two solutions being added simultaneously to a suitable vessel. The resulting reaction mixture is maintained at a pH level of from 4.5 to about 7.0. When the desired quantity of the alumina hydrogel is precipitated, the addition of the ammonium hydroxide and the aluminum sulfate solution is ceased. An alumina hydrogel filter cake is recovered by a simple washing-filtering process during which the soluble alkali metal hydroxides are readily removed, and the soluble alkaline-earth complexes are washed free. The final filter cake is dried for a period of from about 2 to about 12 hours at a temperature of about 200° F. and thereafter calcined at a temperature of from about 800° to about 1400° F., and for a period of from about 2 to about 12 hours. The calcined alumina is ground to a talc-like powder and formed into particles of any desired size and/or shape. An analysis of the calcined alumina particles indicates the presence of less than about 0.0001% by weight (1.0 p.p.m.) of magnesium and calcium.

The foregoing example and specification indicate the method by which impurity-containing aluminum salts may be utilized in the formation of a substantially pure alumina. The benefits afforded through the utilization of the method of the present invention will be readily recognized by those possessing skill within the art of catalysis, and having knowledge of the detrimental affects exhibited by the presence of alkaline-earth metal ions if permitted to remain within the final alumina product which is intended for use as a catalytic carrier material.

I claim as my invention:

1. A method for the preparation of alumina from an aluminum salt containing an ionic alkaline earth metal impurity which comprises subjecting a solution of said salt to gelation at an acidic pH of from about 4.5 to about 7.0 to form an alumina hydrogel, contacting said hydrogel with a cyclo hexyl diamine having a carboxylic acid radical of from about 2 to about 7 carbon atoms attached to each nitrogen atom and said diamine being capable of forming a soluble complex with the alkaline earth metal ions, said diamine being in an amount of at least one mol of diamine per mol of alkaline earth metal ion, washing the resultant soluble complex out of the hydrogel and thereafter calcining the hydrogel to form an alumina substantially free of alkaline earth metal impurity.

2. The method of claim 1 further characterized in that said diamine is added to the aluminum salt solution prior to the gelation of the latter.

3. A method for the preparation of alumina from a solution of an aluminum salt containing an ionic alkaline earth metal impurity which comprises commingling with said solution a cyclo hexyl diamine having a carboxylic acid radical of from about 2 to about 7 carbon atoms attached to each nitrogen atom and said diamine being capable of forming a soluble complex with the alkaline earth metal ions, said diamine being in an amount of at least one mol of diamine per mol of alkaline earth metal ion, gelling the resultant mixture at an acidic pH of from about 4.5 to about 7.0, thereby forming an alumina hydrogel containing the alkaline earth metal ions in the form of a soluble complex with said diamine, washing the hydrogel to remove said complex therefrom, and calcining the washed hydrogel to produce an alumina substantially free of alkaline earth metal impurity.

4. A method for the preparation of alumina from an aluminum salt solution containing calcium and magnesium ions which comprises commingling with said solution at least one mole of 1,3-diaminocyclohexane-N,N'-tetraacetic acid per mol of calcium and magnesium present in the solution, gelling the resultant mixture at a pH of from about 4.5 to about 7.0, thereby forming an alumina hydrogel containing the calcium and magnesium in the form of a soluble complex with said acid, washing the hydrogel to remove said complex therefrom, and calcining the washed hydrogel to produce an alumina substantially free of calcium and magnesium.

5. The method of claim 3 further characterized in that said diamine is 1,3-diaminocyclohexane-N,N'-tetraacetic acid.

6. The method of claim 3 further characterized in that said diamine is 1,4-diaminocyclohexane-N,N'-tetraacetic acid.

7. The method of claim 3 further characterized in that said diamine is 1,2-diaminocyclohexane-N,N'-tetraacetic acid.

8. The method of claim 3 further characterized in that said diamine is 1,3-diaminocyclohexane-N,N' propionic acid.

9. The method of claim 3 further characterized in that said diamine is 1,3-diaminocyclohexane-N,N'-butyric acid.

References Cited in the file of this patent

UNITED STATES PATENTS

| 1,337,192 | Buchner | Apr. 20, 1920 |
| 2,390,272 | Reismeyer et al. | Dec. 4, 1945 |

OTHER REFERENCES

Chaberek et al.: "Organic Sequestering Agents," John Wiley and Sons, Inc., New York, 1959, pages 297, 298, 307, 315 to 324, 575 to 577.

Walton: "Scientific American," vol. 188, No. 6, June 1953, pages 68 to 70, 72, 74 and 76.